United States Patent [19]

Silver et al.

[11] Patent Number: 4,607,077

[45] Date of Patent: Aug. 19, 1986

[54] PHOSPHAZENE FLAME RETARDANTS FOR REACTION INJECTION MOLDED POLY(DICYCLOPENTADIENE)

[75] Inventors: Paul A. Silver; Alexander Lukacs, III, both of Wilmington, Del.

[73] Assignee: Hercules Incorporated, Wilmington, Del.

[21] Appl. No.: 731,435

[22] Filed: May 7, 1985

[51] Int. Cl.[4] ............................ C08K 5/16; C08K 5/03
[52] U.S. Cl. .................................... 524/708; 524/720;
    524/758; 524/796; 524/856; 526/193; 526/233;
    260/DIG. 24
[58] Field of Search ............... 524/708, 415, 371, 239,
    524/720, 758, 796, 856; 526/233, 193;
    260/DIG. 24

[56] References Cited

U.S. PATENT DOCUMENTS 4,079,035 3/1978 Brackenridge ...................... 524/415
4,124,557 11/1978 Dieck et al. ................ 260/DIG. 24
4,400,340 8/1983 Klosiewicz ........................... 524/789
4,485,208 11/1984 Klosiewicz ........................... 524/773

FOREIGN PATENT DOCUMENTS 2085898 5/1982 United Kingdom ................ 524/371

OTHER PUBLICATIONS

*Chemical Abstracts* 90: 169999.
Dow Chemical USA, "Dow FR-300-BA Decabromodiphenyl Oxide".

*Primary Examiner*—John Kight
*Assistant Examiner*—Kriellion Morgan
*Attorney, Agent, or Firm*—Marion C. Staves; William E. Player

[57] ABSTRACT

Poly(dicyclopentadiene) made with an olefin metathesis catalyst system by a Reaction Injection Molding process is improved by adding flame retardant compounds.

21 Claims, No Drawings

PHOSPHAZENE FLAME RETARDANTS FOR REACTION INJECTION MOLDED POLY(DICYCLOPENTADIENE)

BACKGROUND OF INVENTION

U.S. Pat. No. 4,400,340 to D. W. Klosiewicz, incorporated by reference herein, discloses a method for making a thermoset polymer of dicyclopentadiene (DCPD) with a metathesis catalyst system using a Reaction Injection Molding (RIM) process.

In the typical RIM process, at least two reactant streams, at least one of which contains DCPD and each containing one part of a two-part catalyst system, are combined in a mixhead, and this mixture is then injected into a mold where polymerization occurs, forming a thermoset polymer. Being a hydrocarbon, the thermoset polymer has intrinsic flammability and will burn continuously when ignited under Standard UL-94 test procedures.

Until now the prior art has not taught how to make flame retardant poly(DCPD) by a RIM process. Although there exist liquid flame retardant additives for thermoset polymers, they are unsuitable in poly(DCPD) RIM process. To impart effective flame retardancy, they must be used in amounts that can delay or inhibit polymerization.

Solid flame retardants are also known. However, their compatibility in DCPD polymerization using metathesis catalysts was questionable, i.e., some solid flame retardants react with the catalyst thereby inhibiting or preventing polymerization. Also, it was unknown if a compatible solid flame retardant, once found, would also be capable of being incorporated into RIM processing, i.e., would it only require the addition of a sufficiently low enough amount of solids so as not to interfere with the fluid mechanics of RIM processing?

An objective of the present invention is to develop RIM compatible solid flame retardants that are chemically compatible with the metathesis catalyst system, i.e., retardants that will not impede polymerization of dicyclopentadiene, and yet be capable of being dispersed in dicyclopentadiene to form a pumpable slurry.

SUMMARY OF INVENTION

It has now been discovered that poly(DCPD) made by a RIM process can be made flame retardant by incorporating into the catalyst system solid flame retardants comprising brominated phenoxycyclic phosphazenes or aryloxycyclic phosphazenes combined with brominated aromatic compounds.

Accordingly, this invention is related to an improvement wherein, in a method of making a thermoset polymer that comprises the steps of: (a) combining a plurality of reactant streams one of which contains the activator of a metathesis-catalyst system and a moderator, a second which contains the catalyst of the catalyst system, and at least one of which contains dicyclopentadiene and from 0% to about 10% of another monomer to form a reaction mixture; and (b) immediately injecting the reaction mixture into a mold where polymerization occurs, the improvement wherein at least one of the reactant streams contains a solid flame retardant selected from the group consisting of a bromophenoxy derivative of at least one cyclic phosphazene and an aryloxy derivative of at least one cyclic phosphazene combined with a brominated aromatic compound.

DESCRIPTION OF THE PREFERRED EMBODIMENTS

The essence of the subject invention is the incorporation of solid flame retardants into a thermoset polymer of dicyclopentadiene made in a RIM process using olefin metathesis catalysts. These retardants can have either one or two components; the one component retardant is selected from at least one bromophenoxy derivative of at least one cyclic phosphazene while the two component retardant is an aryloxy derivative of at least one cyclic phosphazene combined with a brominated aromatic compound. The flame retardants of the instant invention do not delay or inhibit DCPD polymerization and they are capable of being dispersed in the DCPD monomer to form a slurry that is compatible with RIM processing, i.e., the slurry can be pumped through a mixhead into a mold and cured, resulting in a thermoset polymer throughout which the flame retardants are homogeneously distributed.

The one component flame retardant of this invention can be made by reacting a bromophenol with a phosphonitrilic chloride trimer, tetramer, or mixture. Typical one-component flame retardants are, for example, hexakis-(4-bromophenoxy) cyclotriphosphazene, hexakis-(2,4-dibromophenoxy) cyclotriphosphazene, hexakis[4-tetrabromophthalimido)phenoxy]-cyclotriphosphazene and an 80%–20% mixture of hexakis-(4-bromophenoxy)cyclotriphosphazene and octakis-(4-bromophenoxy)cyclotetraphosphazene respectively. The single component flame retardants can be synthesized by known methods that will be apparent to those skilled in the art.

The one component flame retardant is incorporated into the thermoset polymer, based on the weight of the polymer, in an amount equal to achieve at least 1.5%, preferably 2.0%, phosphorous and at least 8.0%, preferably 10.3%, bromine. In a preferred embodiment, hexakis-(4-bromophenoxy) cyclotriphosphazene is 25% by weight of the thermoset polymer (2.0% P and 10.3% Br). At a maximum, the flame retardant can be about 50%, by weight, of the thermoset polymer (4.0% P and 20.6% Br).

Typical aryloxycyclic phosphazenes useful in making the two component flame retardants in accordance with this invention are, for example, hexaphenoxy cyclotriphosphazene, an 80%/20% mixture of hexaphenoxy cyclotriphosphazene and octaphenoxy cylotetraphosphazene respectively, and octaphenoxy cyclotetraphosphazene. These phosphazenes are made by reacting hydroxylated aromatic compounds, such as cresols, xylenols, phenols and napthols, with phosphonitrilic chloride trimer, tetramer, or mixtures thereof by methods which will be apparent to those skilled in the art.

Typical brominated aromatic compounds useful in accordance with this invention are, for example, N, N'-ethylene-bis-(tetrabromophthalamide), brominated polystyrene, decabromodiphenyl oxide, tetrabromoxylene, brominated poly(phenylene oxide), and octabromodiphenyl oxide.

The two component flame retardant is incorporated into the thermoset polymer, based on the weight of the polymer, in an amount sufficient to achieve at least 0.9% phosphorous and at least 6.0% bromine. In a preferred embodiment, the thermoset polymer is 14% by weight N, N'-ethylene-bis-(tetrabromophthalamide) and 6.9% by weight hexaphenoxy cyclotriphosphazene. At a maximum, the two component flame retardant can be about 50% by weight of the thermoset polymer (4.0% P and 25% Br).

This invention can be used in known RIM processes for making poly(dicyclopentadiene) using a metathesis catalyst system as, for example, shown in U.S. Pat. Nos. 4,400,340, 4,469,809, and 4,485,208 issued to Klosiewicz. These patents are incorporated by reference herein. For example, when the bromophenoxy cyclotriphosphazenes of this invention are incorporated into a RIM process using two DCPD monomer streams, each stream having one component of a $WCl_6$(tungsten chloride)/tri-n-octyl aluminum catalyst and a Lewis base moderator, the DCPD/W mole ratio will be in the range of about 500/1 to about 2000/1, and the W/Al mole ratio will be in the range of about 1/2 to about 1/6. Preferably, the DCPD/W mole ratio is about 1000/1, and the W/Al mole ratio is about 1/3. The Al/Lewis base ratio is preferably maintained at about 1/1. These ratios provide a cycle time, i.e., the time required to mix, inject, cure, and demold, suitable for RIM processing. It will be apparent to those skilled in the art that in a RIM process comprising more than 2 reactant streams, the flame retardants of this invention need not be in the stream comprising the tungsten component of the tungsten/aluminum catalyst. The flame retardants should not be combined in the stream comprising the aluminum component of the catalyst because of the high reactivity of the aluminum component. However, at least one flame retardant, i.e., hexaphenoxcyclotriphosphazene, has been stored with the aluminum component for eight hours without adversely effecting the catalyst.

Preferably, the flame retardant is dispersed in the dicyclopentadiene monomer prior to the blending of the reactive monomer streams in the RIM mixhead to insure even distribution of the flame retardant in the thermoset polymer. To make this dispersion, the retardant can be added to the monomer which has been heated to a liquid state (35°–40° C.) in a closed vessel equipped with a high shear mixer, e.g., Cowles mixer, which can be purged with an inert gas such as nitrogen; purging being necessary to exclude moisture and entrapped air which can effect the catalyst during RIM processing. The retardant can make up as much as 65% by weight of the dispersion for storage purposes. It may also be preferable to combine certain other additives in the dispersion. A diluent, such as xylene, can be added to lower viscosity and prevent solidification of the monomer on cooling of the dispersion. Desireable antioxidants, such as 1,3,5-trimethyl-2,4,6-tris-(3,5-di-tert-butyl-4-hydroxybenzyl) benzene or 2,6-di-tertiary-butyl-para-cresol, stabilizers and pigments, etc., can be added as well as from 0% to about 10% of another polymerizable olefinic monomer such as norbornene.

In a preferred embodiment, this dispersion becomes the basis for one of the reactant streams in a 2 stream RIM process. When using a tungsten/aluminum alkyl catalyst system, the tungsten component is then added to the dispersion just prior to RIM processing. More DCPD may also be added to the dispersion just prior to RIM processing. This may be desirable if a stored dispersion has a DCPD/flame retardant ratio which requires modifying to achieve the desired ratio in the final product, i.e., the thermoset polymer.

The flame retardants can be stored with the tungsten component of a tungsten/aluminum catalyst system if desired as shown in Example 9. All parts and percentages are by weight unless indicated otherwise.

EXAMPLES

In order to more fully explain the instant invention, the following examples are provided. These examples are intended to be illustrative only, and the instant invention is not limited thereto.

EXAMPLE 1

To synthesize hexaphenoxy cyclotriphosphazene (PCTP), in a flask equipped with a condenser, addition funnel, and a magnetic stir bar, 35.0 parts of KOH are dissolved in 266.4 parts of tetrahydrofuran. 58.7 parts of phenol are added to the solution very slowly with stirring for one hour. Continuing stirring, a solution of 34.2 parts of phosphonitrilic chloride trimer dissolved in 266.4 parts of tetrahydrofuran are added. The resultant mixture is then refluxed for 18 hours. After cooling, the mixture is filtered to remove some of the KCl, and the filtrate is reduced to an oily residue on a rotary evaporator. Acetone is then added, and the resultant solution is poured into 1600 parts of distilled water with stirring. A solid precipitate is formed, collected, washed with water a second time and dried. The yield is 63.9 parts of hexaphenoxy cyclotriphospazene (88%); mp=57° C.

Examples 2, 3, and 4 illustrate the use of the 2 component flame retardant in parts made by RIM processing. These parts are tested for flame retardancy according to ANSI/UL 94-1979.

EXAMPLE 2

Charge a suitable closed mixing vessel equipped with a high shear stirrer with 37 parts liquified dicyclopentadiene, 7.5 parts PCTP, 15.2 parts N, N'-ethylene-bis-tetrabromophthalimide and 0.6 parts of the antioxidant 1,3,5-trimethyl-2,4,6-tris(3,5-di-tert-butyl-4-hydroxy benzyl) benzene mix until the solids are uniformly dispersed.

A shaped object is molded from equal volumes of two reactant streams of a RIM process, one stream conprising the above dispersion and dicyclopentadiene with a $WCl_6$ catalyst and the other stream comprising dicyclopentadiene and a tri-n-octyl aluminum/diglyme complex such that the DCPD/W/Al/ether molar ratio is 1000/1/3/3. The molded part has a V-O rating at $\frac{1}{8}''$ or greater when tested according to Standard UL-94. V-O is the best flame retardancy rating as defined in UL-94.

EXAMPLE 3

Charge a suitable closed mixing vessel equipped with a high shear stirrer with 38.8 parts liquified dicyclopentadiene, 10.1 parts PCTP, 10.4 parts N, N'-ethylene-bis-tetrabromophthalamide and 0.6 parts of the antioxidant described in Example 2. Mix until the solids are uniformly dispersed.

A part molded from equal volumes of the above dispersion and dicyclopentadiene with $WCl_6$ catalyst and tri-n-octyl aluminum/diglyme complex such that the DCPD/W/Al/ether molar ratio is 1000/1/3/3 has a V-O rating at $\frac{1}{8}''$ or greater when tested according to Standard UL-94.

EXAMPLE 4

Charge a suitable closed mixing vessel equipped with a high shear stirrer with 36.7 parts liquified dicyclopentadiene, 15.2 parts N-N'-ethylene-bis-tetrabromophthalamide, 0.6 parts of the antioxidant used in Example 2 and 7.5 parts PCTP prepared from phenol and an 80/20 mixture of phosphonitrilic chloride trimer and tetramer. Mix until the solids are uniformly dispersed.

A part molded from equal volumes of the above dispersion and dicyclopentadiene with $WCl_6$ catalyst and tri-n-octyl aluminum/diglyme complex such that the DCPD/W/Al/ether molar ratio is 1000/1/3/3 has a V-O rating at $\frac{1}{8}''$ or greater when tested according to Standard UL-94.

In Examples 5-8, the single component flame retardant of this invention is illustrated. In Example 5, the synthesis of the flame retardant is shown, and in Examples 6-8, the retardant is incorporated into RIM molded parts, which are then tested for flame retardancy according to ANSI/UL-94-1979.

EXAMPLE 5

To sythesize Hexakis-(4-bromophenoxy)cyclotriphosphazene (BPCTP), in a flask equipped with a condenser, addition funnel and magnetic stir bar, 29.75 parts KOH are dissolved in 65 parts 1,2-dimethoxyethane. 77.75 parts 4-bromophenol are added and the mixture stirred for one hour. Dropwise with stirring a solution of 23.25 parts phosphonitrilic chloride trimer in 43 parts 1,2-dimethyoxyethane is added. After addition is complete, the mixture is heated to reflux for four hours.

After cooling, the mixture is poured over ice in a blender and blended until a smooth slurry is obtained. The solid is filtered and the blending process repeated twice more. After the final filtration, the solid cake is washed with deionized water and dried. The product prepared in this way is of small enough particle size for RIM processing. Yield is 70 parts (86%); mp=167°-174° C.

EXAMPLE 6

Charge a suitable closed mixing vessel equipped with a high shear stirrer with 63 parts liquified dicyclopentadiene, 65 parts BPCTP and 1.30 parts of the antioxidant used in Example 2. Mix until the solids are uniformly dispersed.

A part molded from equal volumes of the above dispersion and dicyclopentadiene with $WCl_6$ catalyst and tri-n-octyl aluminum/diglyme complex such that the DCPD/W/Al/ether molar ratio is 1000/1/3/3 has a V-O rating at $\frac{1}{8}''$ or greater when tested according to Standard UL-94.

EXAMPLE 7

Charge a suitable closed mixing vessel equipped with a high shear stirrer with 54 parts liquified dicyclopentadiene, 45 parts BPCTP and 1.0 part of the antioxidant used in Example 2. Mix until the solids are uniformly dispersed.

A part molded from equal volumes of the above dispersion and dicyclopentadiene with $WCl_6$ catalyst and tri-n-octyl aluminum/diglyme complex such that the DCPD/W/Al/ether molar ratio is 1000/1/3/3 has a V-O rating at $\frac{1}{8}''$ or greater when tested according to Standard UL-94.

EXAMPLE 8

Charge a suitable closed mixing vessel equipped with a high shear stirrer with 32.6 parts liquified dicyclopentadiene, 0.6 parts of the antioxidant used in Example 2. and 26.8 parts BPCTP prepared from 4-bromophenol and a 80/20 mixture of phosphonitrilic chloride trimer and tetramer. Mix until the solids are uniformly dispersed.

A part molded from equal volumes of the above dispersion and dicyclopentadiene with $WCl_6$-catalyst and tri-n-octyl aluminum/diglyme complex such that the DCPD/W/Al/ether molar ratio is 1000/1/3/3 has a V-O rating at $\frac{1}{8}''$ or greater when tested according to Standard UL-94.

As Examples 1-8 illustrate, the flame retardants of this invention do not interfere with polymerization in RIM processing, and yet impart effective flame retardant properties to RIM molded objects.

EXAMPLE 9

To illustrate the storage stability of this invention, test tube polymerizations are performed. Three groups of test tubes are prepared containing dicyclopentadiene and the tungsten chloride component of a tungsten chloride/tri-n-octylaluminum catalyst system. In two of the groups, a flame retardant, hexakis-(4-bromophenoxy)-cyclotriphosphazene is added; the third group remains as a control. Polymerizations are conducted by adding the aluminum catalyst component to the test tubes; some polymerizations are conducted immediately, others after the test tube groups have been stored for 24 hours. Induction times, i.e., the time elapsed between the aluminum catalyst component addition and the onset of polymerization, are recorded, and the results summarized in Table I. Samples are prepared such that the dicyclopentadiene/tungsten/aluminum molar ratio is 500/1/3, and the flame retardant comprises 20% by weight of the polymerized mixtures.

TABLE I

| Sample | Induction Time (Seconds) |
| --- | --- |
| Control Group | 16 |
| Control Group-X | 32 |
| Group 1 | 30 |
| Group 1-X | 40 |
| Group 2 | 15 |
| Group 2-X | 50 |

X = 24 hours storage

The data from Table I suggest that hexakis(4-bromophenoxy)cylotriphophazene does not interfere with polymerization of stored samples. In group 2, induction time increased from 15 to 50 seconds, in group 1, 30 to 40 seconds. Both of these results are consistent with change in the control group from 16 to 32 seconds.

EXAMPLE 10

Charge a suitable closed mixing vessel equipped with a high shear stirrer with 46.55 parts liquified dicyclopentadiene, 0.75 parts of the antioxidant used in Example 1, 18.31 parts decabromodiphenyl oxide and 10.31 parts PCTP. Mix until the solids are uniformly dispersed.

A part molded from equal volumes of the above dispersion and dicyclopentadiene with $WCl_6$-catalyst and tri-n-octyl aluminum/diglyme complex, such that the DCPD/W/Al/ether mole ratio is 1000/1/3/3, has a V-O at $\frac{1}{8}''$ or greater when tested according to standard UL-94.

I claim:

1. In a method of making a thermoset polymer that comprises the steps of:
   (a) combining a plurality of reactant streams one of which contains the activator of a metathesis catalyst system and a moderator, a second which contains the catalyst of the catalyst system, and at least one of which contains dicyclopentadiene and from 0% to about 10% of another olefinic monomer to form a reaction mixture; and (b) immediately injecting the reaction mixture into a mold where polymerization occurs, the improvement wherein at least one of the reactant streams contains a solid flame retardant selected from the group consisting of (i) a bromophenoxy derivative of at least one cyclic phosphazene and (ii) a combination of an aryloxy derivative of at least one cyclic phosphazene with a brominated aromatic compound wherein the brominated aromatic compound is N, N'-ethylene-bis-(tetrabromophthalimide), brominated polystyrene, decabromodiphenyl oxide, tetrabromoxylene, brominated poly(phenylene oxide), or octabromodiphenyl oxide.

2. The method of claim 1 wherein the solid flame retardant is a bromophenoxy derivative of at least one cyclic phosphazene.

3. The method of claim 2 wherein the bromophenoxy derivative of at least one cyclic phosphazene is a mixture of hexakis-(4-bromophenoxy) cyclotriphosphazene and octakis-(4-bromophenoxy) cyclotetraphosphazene.

4. The method of claim 2 wherein the bromophenoxy derivative of at least one cyclic phosphazene is hexakis-(4-bromophenoxy) cyclotriphosphazene.

5. The method of claim 1 wherein the solid flame retardant is a combination of an aryloxy derivative of at least one cyclic phosphazene with a brominated aromatic compound wherein the brominated aromatic compound is N,N'-ethylene-bis-(tetrabromophthalimide), brominated polystyrene, decabromodiphenyl oxide, tetrabromoxylene, brominated poly(phenylene oxide), or octabromodiphenyl oxide.

6. The method of claim 5 wherein the aryloxy derivative of at least one cyclic phosphazene is hexaphenoxy cyclotriphosphazene.

7. The method of claim 5 wherein the aryloxy derivative of at least one cyclic phosphazene is a mixture of hexaphenoxy cyclotriphosphazene and octaphenoxy cyclotetraphosphazene.

8. The method of claim 5 wherein the brominated aromatic compound is N, N'-ethylene-bis(tetrabromophthalimide).

9. The method of claim 5 wherein the brominated aromatic compound is decabromodiphenyl oxide.

10. A thermoset polymer of poly(dicyclopentadiene) prepared by:
(a) combining a plurality of reactant streams one of which contains the activator of a metathesis catalyst system and a moderator, a second of which contains the catalyst of the catalyst system, at least one of which contains dicyclopentadiene and from 0% to about 10% of another olefinic monomer, and at least one of which contains a solid flame retardant selected from the group consisting of (i) a bromophenoxy derivative of at least one cyclic phosphazene and (ii) a combination of an aryloxy derivative of at least one cyclic phosphazene with a brominated aromatic compound wherein the brominated aromatic compound is N, N'-ethylene-bis-(tetrabromophthalimide), brominated polystyrene, decabromodiphenyl oxide, tetrabromoxylene, brominated poly(phenylene oxide), or octabromodiphenyl oxide; and
(b) immediately injecting the reaction mixture into a mold where polymerization occurs.

11. A composition polymerizable in a RIM process using an olefin metathesis catalyst comprising dicyclopentadiene and a solid flame retardant selected from the group consisting of (i) a bromophenoxy derivative of at least one cyclic phosphazene and (ii) a combination of an aryloxy derivative of at least one cyclic phosphazene with a brominated aromatic compound wherein the brominated aromatic compound is N, N'ethylene-bis-(tetrabromophthalimide), brominated polystyrene, decabromodiphenyl oxide, tetrabromoxylene, brominated poly(phenylene oxide), or octabromodiphenyl oxide.

12. A method for making a thermoset polymer comprising the steps of:
(a) combining a plurality of reactant streams one of which contains the activator of a metathesis catalyst system and a moderator, a second of which contains the catalyst of the catalyst system, at least one of which contains dicyclopentadiene and from 0% to about 10% of another olefinic monomer, and at least one of which contains a solid flame retardant selected from the group consisting of (i) a bromophenoxy derivative of at least one cyclic phosphazene and (ii) a combination of an aryloxy derivative of at least one cyclic phosphazene with a brominated aromatic compound wherein the brominated aromatic compound is N, N'-ethylene-bis-(tetrabromophthalimide), brominated polystyrene, decabromodiphenyl oxide, tetrabromoxylene, brominated poly(phenylene oxide), or octabromodiphenyl oxide; and
(b) immediately injecting the reaction mixture into a mold where polymerization occurs.

13. The method of claim 12 wherein the solid flame retardant is a bromophenoxy derivative of at least one cyclic phosphazene.

14. The method of claim 13 wherein the bromophenoxy derivative of at least one cyclic phosphazene is a mixture of hexakis-(4-bromophenoxy) cyclotriphosphazene and octakis-(4-bromophenoxy) cyclotetraphosphazene.

15. The method of claim 13 wherein the bromophenoxy derivative of at least one cyclic phosphazene is hexakis-(4-bromophenoxy) cyclotriphosphazene.

16. The method of claim 12 wherein the solid flame retardant is a combination of an aryloxy derivative of at least one cyclic phosphazene with a brominated aromatic compound wherein the brominated aromatic compound is N, N'-ethylene-bis-(tetrabromophthalimide), brominated polystyrene, decabromodiphenyl oxide, tetrabromoxylene, brominated poly(phenylene oxide), or octabromodiphenyl oxide.

17. The method of claim 16 wherein the aryloxy derivative of at least one cyclic phosphazene is hexaphenoxy cyclotriphosphazene.

18. The method of claim 16 wherein the aryloxy derivative of at least one cyclic phosphazene is a mixture of hexaphenoxy cyclotriphosphazene and octaphenoxy cyclotetraphosphazene.

19. The method of claim 16 wherein the brominated aromatic compound is N,N'-ethylene-bis(tetrabromophthalimide).

20. The method of claim 16 wherein the brominated aromatic compound is decabromodiphenyl oxide.

21. In a thermoset polymer comprising dicyclopentadiene and 0% to 10% of another polymerizable olefinic monomer the improvement wherein the polymer further comprises a solid flame retardant selected from the group consisting of (i) a bromophenoxy derivative of at least one cyclic phosphazene and (ii) a combination of an aryloxy derivative of at least one cyclic phosphazene with a brominated aromatic compound wherein the brominated aromatic compound is N,N'-ethylene-bis-(tetrabromophthalimide), brominated polystyrene, decabromodiphenyl oxide, tetrabromoxylene, brominated poly(phenylene oxide), or octabromodiphenyl oxide.

* * * * *